United States Patent [19]

Campbell

[11] 4,252,362
[45] Feb. 24, 1981

[54] PICKUP BED COVER

[76] Inventor: John T. Campbell, Box 126, Midwest, Wyo. 82643

[21] Appl. No.: 82,649

[22] Filed: Oct. 9, 1979

[51] Int. Cl.³ .................................................. B60J 7/10
[52] U.S. Cl. ..................................... 296/98; 296/100
[58] Field of Search ................. 296/100, 98; 105/377; 160/201, 133, 84 R

[56] References Cited

U.S. PATENT DOCUMENTS

| | | | |
|---|---|---|---|
| 3,472,548 | 10/1969 | Comisac | 296/98 |
| 3,649,072 | 3/1972 | Cross | 296/100 |
| 3,762,763 | 10/1973 | Deshores | 296/100 |
| 3,986,749 | 10/1976 | Hull | 296/100 |
| 4,199,188 | 4/1980 | Albrecht | 296/100 |

*Primary Examiner*—Robert R. Song
*Attorney, Agent, or Firm*—Edwin L. Spangler, Jr.

[57] ABSTRACT

This invention relates to a cover for the open bed of a pickup truck or the like characterized by a multi-channelled track having a first pair of parallel rails leading out of a storage area horizontally along the rim of the truck bed and at least a second pair of rails branching off the first pair at a point intermediate the ends thereof down to the floor of the bed. A rollable or otherwise storable fabirc or slatted canopy is drawn out of its stored condition where it extends transversely of the rails adjacent one end of the first or main pair thereof into a position where it covers all or a portion of the bed. More specifically, the canopy either remains in the first set of rails coacting with an upstanding wall of the truck bed to define a closed compartment thereunder encompassing essentially its maximum horizontal area or, alternatively, compartmentalizing only a portion of the latter by using only a section of the first rails and a pair of the branched rails.

6 Claims, 6 Drawing Figures

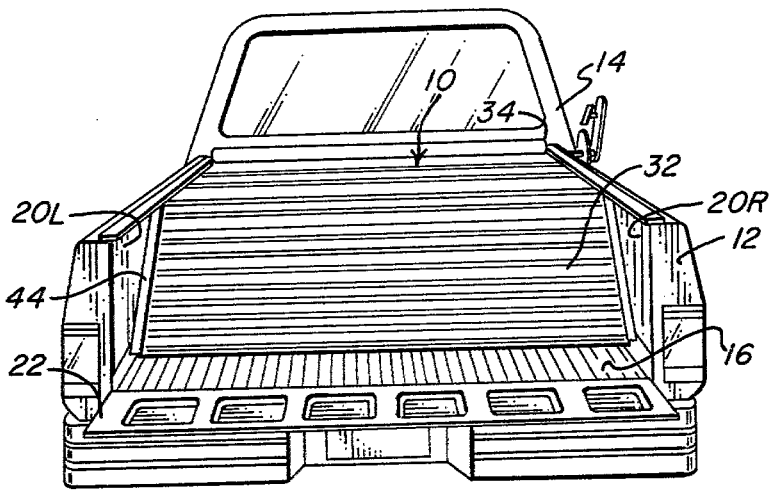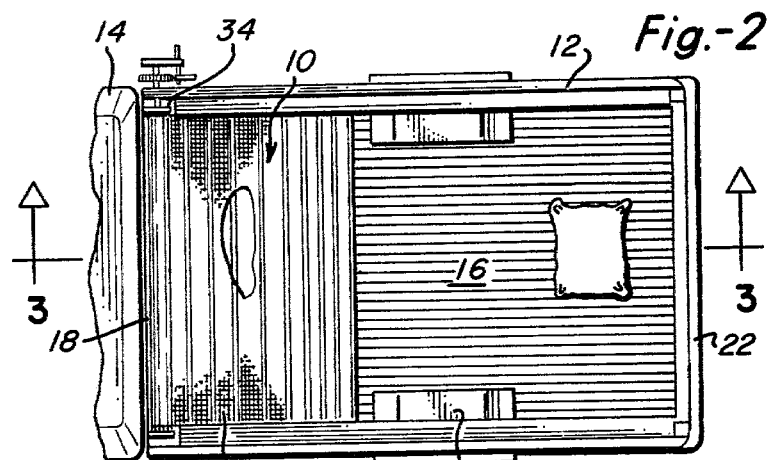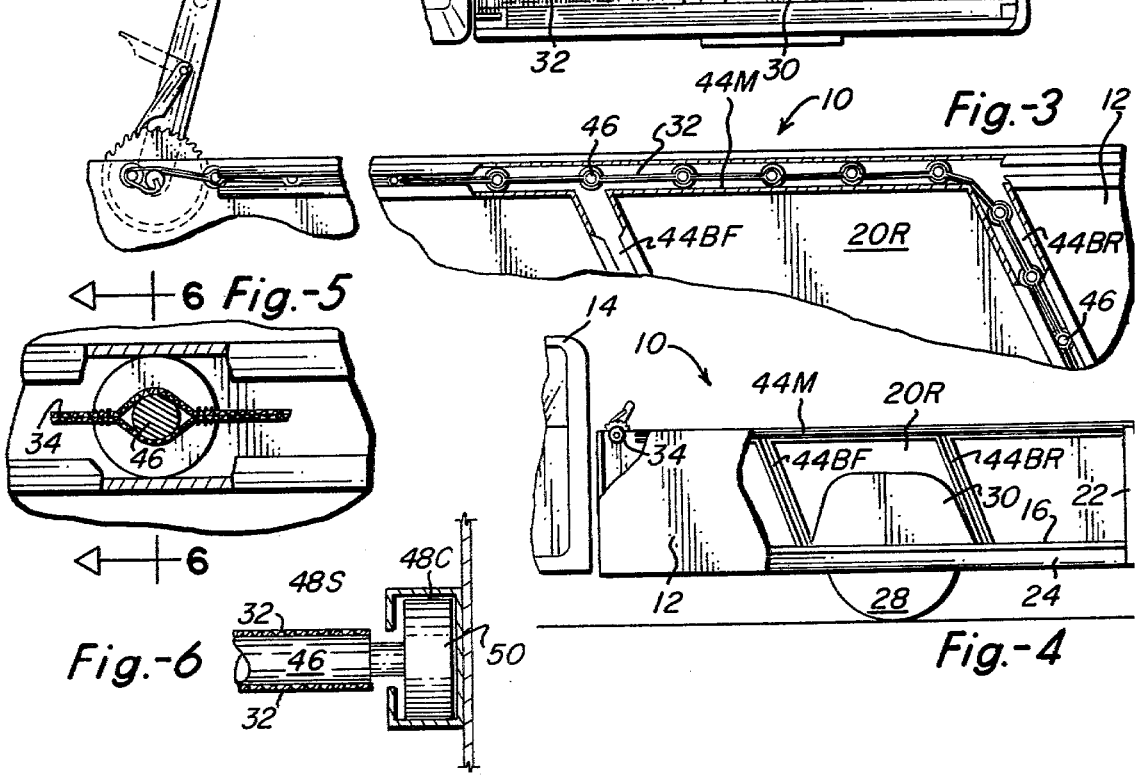

PICKUP BED COVER

Open-topped truck beds invite theft when left uncovered with valuables of one kind or another stored therein. There are, of course, many solutions to this problem including such things as covering the entire bed with a so-called "camper" body. Enclosing the bed with a unit of this type or some other rigid covering equally difficult to remove lessens the utility of the truck to a considerable degree when needed for normal haulage requirements.

Other types of less permanent canvas and metal covers are well known in the art which preserve more of the utility of the vehicle as a truck as opposed to living quarters on a short term temporary basis. Examples of such covers are those exemplified by the following U.S. Pat. Nos.:

| | |
|---|---|
| 2,757,042 Schultz | 3,366,414 Thompson et al |
| 2,771,319 Renquist | 3,820,840 Frosberg |
| 3,165,352 Hallock | 3,829,151 Fellenstein |
| 3,342,523 Lutgen | 3,986,749 Hull |

In the above group, the Thompson patent shows that it is old in the art to roll up a fabric canopy while Shultz and Forsberg teach the concept of storing the canopy in pleated form. Even the concept of slatted canopies is an old one as exemplified by the Renquist and Hull patents. None of these patents including that of Fellenstein, however, reveals the novel concept of the instant invention, namely, that of providing a cover structure capable of dividing off all or a portion of the bed into a closed compartment while, in the case of the partial coverage, leaving the remainder of the bed open and fully accessible.

Persons who have need of a pickup especially in populated areas find it desirable to be able to cover up tools and other items too bulky to store in the cab while, at the same time, leaving the remaining portion of the bed, if any, uncovered for ready access to those things less likely to be stolen. In this way the utility of the vehicle is maximized and, at the same time, the security of its cargo is enhanced.

As far as the canopy itself is concerned, it may either be of the fabric type exemplified by Thompson, Shultz and Forsberg previously, or slatted ones like those of Renquist and Hull, all being well known in the art and equally well suited for use with applicant's multi-channelled track. In fact, probably one of the best canopies is a combination of the two types just referred to, specifically, a basic canvas or other type of fabric cover reinforced at longitudinally-spaced intervals with transverse rigid rods or slats.

The same thing is true of the storage of the canopy, i.e. it can either be stored rolled up "window blind fashion" or folded into a series of pleats. In other words, both of these storage methods are well known in the art as previously noted and, in addition, are entirely compatible with applicant's track.

It is, therefore, the principal object of the present invention to provide a novel and improved cover for the open-topped bed of a truck, usually a pickup.

A second objective is the provision of a device of the class described which can be used to close off all or a portion of the bed and form a covered compartment thereof.

Another object of the apparatus herein disclosed and claimed is to provide means for producing a closed compartment in one end of the bed while leaving the remainder thereof open for ordinary haulage requirements.

Still another objective of the within described invention is that of selectively compartmentalizing the bed of a truck or the like into compartments of different sizes.

An additional object is to provide a versatile, yet inexpensive, way of protecting the contents of an open-topped truck bed without having to close it off entirely.

Further objects are to provide a pickup bed cover which is simple, lightweight, easy to use, convenient, attractive, compact, out of the way when not in use, safe, reasonably rugged and one that can readily be adapted for use on different sizes and styles of truck beds.

Other objects will be in part apparent and in part pointed out specifically hereinafter in connection with the description of the drawings that follows, and in which:

FIG. 1 is a perspective view looking at the rear end of a conventional pickup truck equipped with the cover of the present invention shown in place to close off a compartment encompassing approximately the front two-thirds of the latter;

FIG. 2 is a fragmentary top plan view to a somewhat reduced scale and with portions thereof broken away to both conserve space and to more clearly reveal the interior construction;

FIG. 3 is a greatly enlarged fragmentary section taken along line 3—3 of FIG. 2.

FIG. 4 is a side elevation to the same scale as FIG. 2 and with the near side of the truck bed broken away to show the track on the far side thereof;

FIG. 5 is a fragmentary section similar to FIG. 3 but to a still further enlarged scale showing the details of one rail of the main track and the canopy including its guide rods with rollers on the ends, portions thereof having been broken away and shown in section to more clearly reveal the interior construction; and, FIG. 6 is a fragmentary section taken along line 6—6 of FIG. 5 revealing essentially the very same elements and to exactly the same scale.

Referring next to the drawings for a detailed description of the present invention and initially to FIGS. 1, 2 and 4 for this purpose, reference numeral 10 has been selected to broadly designate the pickup bed cover forming the subject matter hereof and it will be seen mounted in the open-topped bed 12 of a pickup truck 14. The bed is of conventional design having a floor 16, a front wall 18, right and left side panels 20R and 20L, respectively, and a hinged tail gate 22. The chassis 24 mounts both the bed and the cab 26 and it, in turn, is supported upon wheels 28. As is the case with most pickups, the width of the bed is such that the wheels are housed in wheel wells 30 projecting into the cargo area from each of the two side panels.

In the particular version shown, the canopy 32 of the cover 10 will be seen to comprise a double-layered sheet of fabric such as canvas, heavy plastic or the like housed on a reel 34 journalled for rotation in transverse position atop the front wall 18 of the bed. As previously mentioned, the canopy can just as well be of the slatted type which, while somewhat heavier and more expensive, offers a greater degree of security for the cargo housed therebeneath. In like manner, the canopy can, if desired, be stored in pleated fashion much like the commonplace foldable doors that hang from an overhead track and oftentimes are guided along the floor as well. The reel type storage for the canopy or curtain has been chosen for illustration primarily because it takes up less space and, therefore, provides greater access to the cargo area therebeneath when rolled up.

Reel 34 can, of course, be actuated in various ways, most of which are well known in the art and, for this reason, form no part of the present invention. One simple mechanism is that which has been illustrated most clearly in FIG. 3 and to which brief reference will now be made. As shown, reel 34 has a central shaft 36 having a ratchet wheel 38 affixed to one end thereof for conjoint rotation. Also mounted on this shaft adjacent the ratchet wheel but for independent relative rotation is a crank 40 that carries a pawl 42 pivotally mounted alongside thereof for movement into and out of operative engagement with the ratchet wheel. When winding up the canopy, the ratchet and pawl are obviously engaged (full line position) so as to rotate the reel upon counterclockwise rotation of the crank. On the other hand, the pawl will be moved out of operative engagement with the ratchet wheel (phantom line position) when the canopy is unrolled because it is a simple matter to pull it out and along the track 44 to whatever extent necessary. No attempt has been made to illustrate the various and sundry appurtenances to such a ratchet mechanism, such a spring-biased pawl, a latch for the handle to hold it in stowed position, friction members to stop reel rotation when the pull on the curtain is released, etc. because all such features are well within the skill of the ordinary artisan and have been used by others in similar situations for a very long time. Instead, the ratchet and pawl mechanism shown in FIG. 3 is intended as being broadly illustrative of but one kind of winch mechanism operative to actuate the reel 34 and stow the curtain thereon.

Turning primary attention next to FIGS. 5 and 6, it can be seen that the particular canopy 32 illustrated herein consists of, in addition to the double-layered fabric sheet, a plurality of transversely-extending guide members 46, those shown taking the form of rigid rods. These rods are hemmed or otherwise secured in fixed spaced parallel relation between the double-layered canopy. Here again, this is but one of many ways in which stiffeners can be added to a fabric canopy and no novelty is prescribed for the method shown. In fact, the fabric can be eliminated altogether in favor of a close-coupled series of parallel slats held together by cords much in the manner of an old style roll-up bamboo curtain of the type used out-of-doors as a sunshield.

The track 44 is most clearly revealed in FIGS. 3 and 4 to which detailed reference will next be made. Broadly speaking, it comprises a sort of a main channel 44M analogous to the main line of a railroad that runs horizontally along the top of each side panel preferably the full length thereof and at least one branch 44B analogous to a railroad's spur line located intermediate its ends that extends downwardly to the floor 16. When the curtain or canopy 32 is pulled out all the way to the rear end of the bed using only the main channel 44M, it cooperates with the tailgate 22 in closed position and with the rest of the bed to define a single closed compartment in much the same way as several of the prior art covers for this purpose. Alternatively, however, when the canopy is channeled to use only a part of the main channel 44M and the branch channel 44B, it creates a smaller sized closed compartment extending rearwardly from the front wall 18 while leaving the bed open therebehind.

In the preferred embodiment, again most clearly revealed in FIGS. 3 and 4, the track 44 includes not one, but two or more branches, the forwardmost one having been identified as 44BF while the rear one of the two is similarly identified by 44BR. As illustrated these two branch channels essentially parallel one another in fixed spaced relation on opposite sides of the wheel well 30. Using front branch channel 44BF, nearly two-thirds of the bed is left open for cargo that does not need to be covered; whereas, using the rear one 44BR, only about a third is left uncovered. Further compartmentalization of the bed can, of course, be accomplished using additional branch channels.

For purposes of illustration, the rails in FIGS. 5 and 6 will be seen to comprise spaced parallel channels, each of which contains an inwardly-facing generally T-shaped slot 48, the stem portion 48S of which passes the minimal amount of rod 46 projecting beyond the end of the double-layered canopy while the crossbar portion 48C houses nylon rollers 50 rotatably mounted on the opposite ends of each rod. Once again, we have a situation where other types of guides than wheels 50 may be used on the ends of the rods to run within the tracks, the choice coming down to one of cost vs. the much smoother operation of a wheel when compared to, for instance, a slide. Admittedly, with a construction such as that shown, the canopy can probably be pushed away from the side panel along the rod far enough to create an opening sufficient to gain access to the cargo therebeneath with the hand; however, anyone wishing to get under the canopy need only cut it anyway, so security is of secondary significance to weather protection. If, on the other hand, security becomes a paramount consideration, the fabric part of the canopy should include some flexible wire mesh that both resists being cut and also inhibits its being pushed back along the rod. Even this precaution is of no consequence whatsoever unless some means is provided for locking the canopy in closed position which, of course, is easily done by just passing the hasp of a padlock or the like across the track near its end and on the reel side of the guide rod nearest the free end. As before, such security measures are well within the skill of the ordinary artisan and have, in fact, been used countless times before to secure gates closed and for similar applications.

From the foregoing it should be apparent that a novel track subassembly for use with a rollable or foldable canopy and the open-topped bed of a truck as a complete or partial compartmentalizing closure therefor constitutes applicant's novel contribution to the art.

What is claimed is:

1. For use with an open-topped rectangular truck bed of the type having upstanding side panels, a front endwall and a tailgate as a cover therefor: a generally rectangular foldable canopy movable between a relatively compact stowed condition and an extended one sized to reach from one side panel of the bed to the other and longitudinally substantially all the way from the front endwall to its tailgate; a multi-channel track for attachment in transversely-spaced parallel relation along the side panels of the bed and in vertically-spaced relation above the floor thereof, said track including a main channel defined by a first pair of rails adapted to extend substantially horizontally along the side panels from the front endwall rearwardly all the way to the tailgate and at least one branch channel defined by a second pair of rails extending downwardly to the floor from transversely-spaced points intermediate the ends of the main channel; and, connecting means depending from the side margins of the canopy for movement along the rails, said track and canopy cooperating when thus connected and upon installation in the truck bed to define a covered storage compartment encompassing the full area of the latter when said canopy is extended the full length of the main channel, and said track and canopy further cooperating with one another and with the truck bed to define a second smaller closed compartment in the forward end thereof upon full extension of said canopy within the front end of the main channel and all the way to the floor within the branch channel.

2. The truck bed cover as set forth in claim 1 wherein the canopy when fully extended along the main channel cooperates with the tailgate in closed position and with the front endwall and side panels to define a closed compartment.

3. The truck bed cover as set forth in claim 1 which includes storage means mountable transversely along the front endwall of the bed for receiving the canopy in stowed condition.

4. The truck bed cover as set forth in claim 1 wherein the connecting means comprise rigid elements extending from side to side of the canopy in longitudinally-spaced parallel relation to one another, said elements cooperating with one another to prevent the canopy from sagging and to guide same along the tracks.

5. The truck bed cover as set forth in claim 1 wherein the track includes at least two branch channels arranged one behind the other in longitudinally-spaced relation.

6. The truck bed cover as set forth in claim 1 wherein the rails are shaped to include a generally T-shaped groove having vertically-disposed crossbar portion and a horizontally-disposed stem portion opening toward the companion rail of the pair; and, in which the connecting means include T-shaped end portions sized for insertion, retention and relative movement along said rails with said T-shaped slots therein.

* * * * *